United States Patent [19]

Burton

[11] Patent Number: 4,560,142
[45] Date of Patent: Dec. 24, 1985

[54] BUTTERFLY AND BALL VALVES

[75] Inventor: Philip J. Burton, Birmingham, England

[73] Assignee: Charles Winn (Valves) Limited, Birmingham, England

[21] Appl. No.: 549,993

[22] Filed: Nov. 8, 1983

[30] Foreign Application Priority Data

Nov. 12, 1982 [GB] United Kingdom ............... 8232437

[51] Int. Cl.⁴ ............................................. F16K 1/46
[52] U.S. Cl. .................................... 251/306; 251/316;
411/353; 411/517; 411/530
[58] Field of Search ............... 251/306, 305, 314, 315,
251/316, 317; 411/530, 517, 518, 353

[56] References Cited

U.S. PATENT DOCUMENTS

| 3,025,035 | 3/1962 | Swain | 251/306 |
|---|---|---|---|
| 3,221,847 | 12/1965 | Attwood | 411/530 |
| 3,937,441 | 2/1976 | Baumann | 137/315 |
| 4,106,751 | 8/1978 | Niskin | 251/316 |
| 4,272,057 | 6/1981 | Haugland | 137/315 |

FOREIGN PATENT DOCUMENTS

| 966935 | 9/1957 | Fed. Rep. of Germany | 411/517 |
|---|---|---|---|
| 980814 | 5/1951 | France . | |
| 349329 | 5/1931 | United Kingdom | 411/517 |
| 1031999 | 6/1966 | United Kingdom . | |
| 1402846 | 8/1975 | United Kingdom . | |
| 2081842 | 2/1982 | United Kingdom . | |

Primary Examiner—A. Michael Chambers
Assistant Examiner—John C. Fox
Attorney, Agent, or Firm—Louis Bernat

[57] ABSTRACT

In order to provide an unobstructed outer face on a retaining ring for the seal assembly of a butterfly valve, so that the outer face can make an improved seal with an adjacent pipe end, the retaining ring is held captive in the valve housing by a wire ring, instead of by the usual screws which penetrate the outer face and inhibit sealing with the pipe end. The wire ring is of regular polygonal shape such that the central portions of its sides are received in a radially outwardly facing groove in the retaining ring, and its corners are received in a radially inwardly facing groove in the housing. A helical lead-in groove in the housing connects with the housing groove to permit assembly of the retaining ring to the housing by a screwing action.

8 Claims, 5 Drawing Figures

BUTTERFLY AND BALL VALVES

This invention relates to butterfly and ball valve assemblies of the kind comprising a valve housing defining a through-flow passage, a rotatable valve member positioned in the passage, an annular valve seat assembly positioned in the housing for engagement with the valve member and encircling the passage, and a seat retaining ring positioned axially adjacent to the seat assembly and adapted to clamp the seat assembly to the valve housing in use. Such a valve will hereinafter be referred to as a 'valve assembly of the kind set forth'.

Valve assemblies of the kind set forth in use are usually sealed to an adjacent pipe end by an annular gasket which is clamped between a flange on the pipe end and the valve assembly, the radially outer part of one face of the gasket sealing against the valve housing, and the radially inner part of that face sealing against the seat retaining ring.

Often it is convenient to rely upon the clamping force between the pipe flange and the seat retaining ring to clamp the seat assembly in position, to avoid the need for independent clamping means for the seat assembly. However, when that arrangement is employed it is desirable to provide a retaining means for the seat retaining ring to ensure that the seat retaining ring and seat assembly are held captive in the valve housing during transportation and storage of the valve assembly prior to use, and during connection to the pipe.

The retaining means most commmonly comprises a number of axially extending screws which extend through the retaining ring. This arrangement has the disadvantage that the screw holes in the retaining ring restrict the available annular area of the retaining ring for engagement by the gasket and thus the gasket sealing area.

The present invention aims to provide a retaining means in the form of a wire ring which does not place restrictions upon the gasket sealing area of the retaining ring.

According to the invention a valve assembly of the kind set forth comprises a wire ring holding captive the seat retaining ring to the valve housing, the wire ring having portions of larger radius alternating circumferentially with portions of smaller radius, a first annular groove in a radially inwardly facing surface of the valve housing, an opposing second annular groove in a radially outer surface of the retaining ring, the larger radius portions of the wire ring being received substantially within the first groove, and the smaller radius portions of the wire ring being received substantially within the second groove, and a substantially helical lead-in groove in said valve housing surface or in said retaining ring surface leading from the adjacent end of the valve housing or from the inner end of the retaining ring respectively and connecting with the first or second annular groove respectively.

Preferably the lead-in groove is provided in the housing.

Since the larger radius portions of the wire ring are engaged in the first annular groove in the valve housing, and the smaller radius portions of the wire ring are engaged in the second annular groove in the retaining ring, the retaining ring is held captive to the valve housing by the wire ring. The lead-in groove in the housing or retaining ring enables the retaining ring to be assembled into position in the valve housing by a screwing action, and to be removed when it is required to gain access to the seal assembly.

In order to remove the retaining ring from the housing it is necessary both to turn it and to pull it axially outwardly of the housing, in order first to engage the wire ring in the lead-in groove and then to unscrew the wire ring from the lead-in groove.

This arrangement ensures that even though the retaining ring may be unintentionally rotated prior to assembly this rotation will not lead to release of the retaining ring.

Since the wire ring substantially encircles the retaining ring, the end face of the retaining ring is unobstructed and its entire surface is availabe for sealing purposes.

The wire ring may be a continuous ring but preferably it has free ends, which preferably abut each other or are closely adjacent to each other.

When the wire ring has free ends these are preferably bent into a substantially radial direction for location purposes. When the lead-in groove is provided in the housing the retaining ring is then provided with a radial hole extending from the second annular groove to receive the wire ends thereby to retain the wire ring non-rotatably in position on the retaining ring during assembly or removal of the retaining ring from the housing. Alternatively, when the lead-in groove is provided on the retaining ring a radial hole is provided in the housing to retain the wire ring captive to the housing during assembly and removal of the retaining ring.

Although the wire ring may be of undulatory form, in a preferred arrangement the wire is bent substantially into a regular polygonal shape, whereby the larger radius portions are constituted by the corners of the polygon, and the smaller radius portions are constituted by the central regions of the sides of the polygon.

In most cases it will be sufficient to provide only one lead-in groove in the housing or retaining ring, but if desired a plurality of lead-in grooves may be provided.

The wire may be of stainless steel, aluminium bronze or titanium for example depending upon the fluid to be handled.

In the event that the wire ring becomes stuck in service and it is required to remove the retaining ring, the seal assembly and retaining ring may be drifted out thereby shearing the wire ring. This is facilitated by ensuring that the larger and smaller radius portions of the wire ring are received wholly within the first and second annular grooves respectively.

The shear strength of the wire ring will depend upon the numbers of larger and smaller radius portions which can be chosen accordingly.

A butterfly valve assembly in accordance with the invention will now be described, by way of example only, with reference to the accompanying drawings in which.

Figure 1:
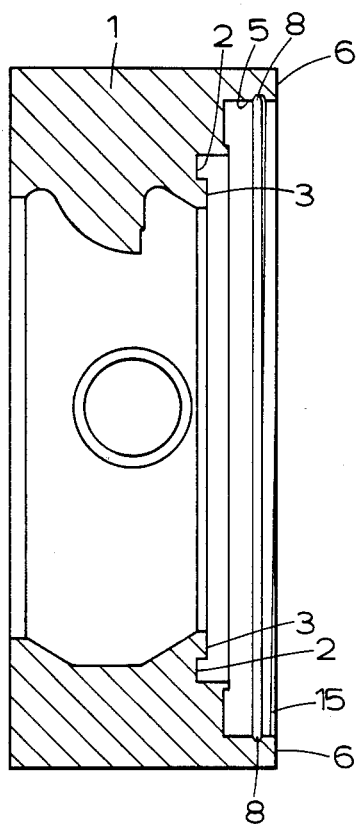
FIG. 1 is a cross-section of the valve housing taken in a plane which includes the axis of the housing.
Figure 2:
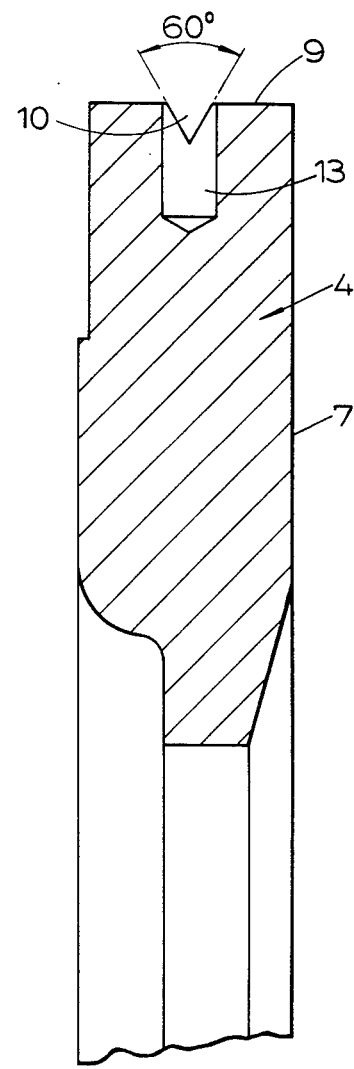
FIG. 2 is a radial cross-section on a larger scale of the retaining ring for the valve seat.
Figure 5:
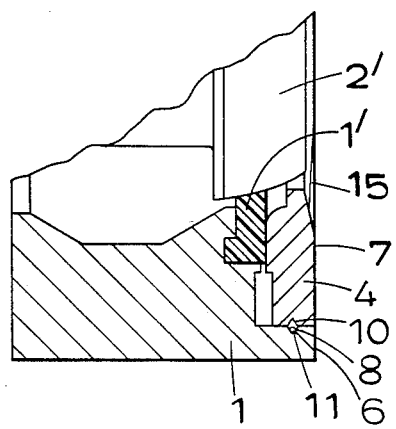
FIG. 5 is a radial cross-sectional partial view of the assembled valve.

Valve housing 1 is formed with outwardly facing annular surfaces 2, 3 against which an annular seal assembly 1; shown in FIG. 5 is clamped in use by an annular metal retaining ring 4 shown in FIG. 2. The seal assembly 1' is adapted to seal with a valve disc 2' in the closed condition of the disc. The retaining ring 4 is received in use in a counterbore 5 to the housing, and when the valve housing 1 is clamped to a flange on a pipe end of the flange seals with the housing end surface 6 and with the end surface 7 of the retaining ring, the clamping force on the retaining ring 4 acting to clamp the seal assembly in position in housing 1.

Housing 1 is provided in the wall defining counterbore 5 with an annular recess 8, and the opposing radially outer surface 9 of the retaining ring is provided with a corresponding annular recess 10 which confronts recess 8 in the assembled condition of the valve.

Figure 3:
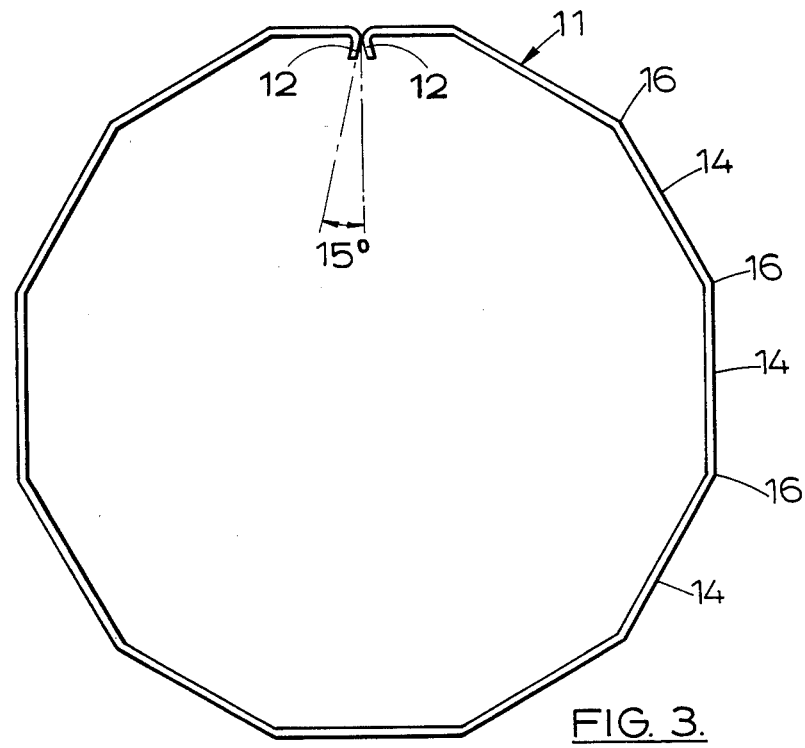
FIG. 3 is a plan view of the wire ring.
Figure 4:
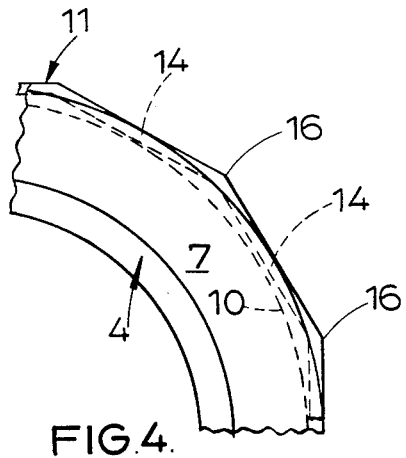
FIG. 4 is a partial view from the right in FIG. 2 but with the wire ring mounted on the retaining ring.

A spring wire ring 11 is shown in FIG. 3, in its free state, the wire having been bent into the shape of a duodecagon with its abutting free ends 12 located midway along one of its sides and being bent inwardly of the ring at an angle of 15° to the radial direction. In a larger valve the wire ring would be provided with more sides. The retaining ring 4 is provided with a single radial hole 13 leading from recess 10 of a diameter to receive both ends 12 when the wire ring 11 is mounted on retaining ring 4 with the central portions 14 of each of its sides received wholly within the recess 10, as shown in FIG. 4. In that condition the ends 12 will be deflected and thereby provide a gripping force between the ends 12 and the sides of the hole 13. The ends 12 hold the wire ring 11 against rotation relative to the retaining ring 4 during assembly of the retaining ring to the valve housing 1.

A single helical lead-in groove 15 extends from the surface 6 of the housing to connect with recess 8. The lead-in groove 15 has the same depth as groove 8 and the same profile generated by a 60° included angle tool.

When the wire ring 11 has been assembled into position on retaining ring 4, as shown in FIG. 4, the retaining ring is offered to the housing 1 and rotated to engage the corner portions 16 successively with the helical lead-in groove 15 so that on further rotation of ring 4 the corner portions 16 successively enter the recess 8 to bring the retaining ring substantially into its assembled position. Face 7 will project slightly from face 6 to provide for a clamping force on the seal assembly when the valve is secured to a pipe flange.

Any further rotation of the retaining ring will not affect its axial position, unless a withdrawal force is applied to the ring during rotation in the appropriate direction to cause the wire corners 16 successively to enter the lead-in groove 15.

Since the face 7 is unobstructed by the wire ring the full area of that face is available for sealing against a pipe flange.

I claim:

1. A valve assembly comprising a valve housing member defining a through-flow passage, a rotatable valve element positioned in said passage, an annular valve seat assembly positioned in said housing member for engagement with said valve element and encircling said passage, a seat retaining ring member positioned axially adjacent to said seat assembly for clamping said seat assembly in use to said valve housing member, a radially inwardly facing surface of said valve housing member being formed with an annular first groove, a radially outwardly facing surface of said seat retaining ring member being formed with an annular second groove confronting said first groove, and a wire ring holding captive said seat retaining ring member to said valve housing member, said wire ring comprising larger radius portions alternating circumferentially with smaller radius portions, said larger radius portions being received substantially within said first groove, and said smaller radius portions being received substantially within said second groove, one of said members being formed in the respective one of said surfaces with a substantially helical lead-in groove connecting with the respective one of said annular grooves provided in said one member and so arranged as to enable assembly together of said members by a relative screwing action of said members when said wire ring is mounted on the other of said members.

2. A valve assembly as in claim 1 wherein said wire ring is of regular polygonal shape.

3. A valve assembly as in claim 1 wherein said wire ring comprises a location portion, and said other member comprises a formation of complementary shape to said location protion to cooperate therewith, whereby said wire ring is held against rotation relative to said other member.

4. A valve assembly as in claim 1 wherein said wire ring has free ends.

5. A valve assembly as in claim 4 wherein said free ends abut each other.

6. A valve assembly as in claim 4 wherein said free ends extend in a substantially radial direction, and said other member is provided with recess means to receive said free ends, whereby said wire ring is held against rotation relative to said other member.

7. A valve assembly as in claim 1 wherein said lead-in groove is provided in said valve housing member.

8. A valve assembly as in claim 1 wherein said valve element is a butterfly member.

* * * * *